(12) United States Patent
Wu et al.

(10) Patent No.: US 11,327,802 B2
(45) Date of Patent: May 10, 2022

(54) SYSTEM AND METHOD FOR EXPORTING LOGICAL OBJECT METADATA

(71) Applicant: Microsoft Technology Licensing, LLC, Redmond, WA (US)

(72) Inventors: Wan Chin Wu, Kirkland, WA (US); Hani Gamal Loza, Kirkland, WA (US); Joe Keng Yap, Sammamish, WA (US); Wenyu Cai, Redmond, WA (US); David Charles Oliver, Seattle, WA (US); Simon Bourdages, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 268 days.

(21) Appl. No.: 16/596,851

(22) Filed: Oct. 9, 2019

(65) Prior Publication Data

US 2021/0034426 A1   Feb. 4, 2021

Related U.S. Application Data

(60) Provisional application No. 62/881,246, filed on Jul. 31, 2019.

(51) Int. Cl.
*G06F 9/46* (2006.01)
*G06F 9/50* (2006.01)

(52) U.S. Cl.
CPC .................. *G06F 9/5027* (2013.01)

(58) Field of Classification Search
CPC ....... G06F 9/5027; G06F 9/543; G06F 9/5005
See application file for complete search history.

(56) References Cited

U.S. PATENT DOCUMENTS

| | | | | |
|---|---|---|---|---|
| 6,393,540 B1 * | 5/2002 | Blumenau | ............... | G06F 3/061 711/165 |
| 6,542,909 B1 * | 4/2003 | Tamer | ................... | G06F 9/4493 707/756 |
| 6,564,219 B1 * | 5/2003 | Lee | ......................... | G06F 16/25 707/769 |

(Continued)

OTHER PUBLICATIONS

"International Search Report and Written Opinion Issued in PCT Application No. PCT/US20/036222", dated Sep. 18, 2020, 14 Pages.

(Continued)

*Primary Examiner* — Adam Lee
(74) *Attorney, Agent, or Firm* — Michael Best & Friedrich LLP

(57) ABSTRACT

Systems and methods for exporting logical object metadata. In one example, the system includes an electronic processor configured to receive a first input from a user. The first input includes a logical object location and at least one metadata export option. The electronic processor is also configured to create an export job based upon the first input. The electronic processor is also configured to store the export job in a job queue, determine when a computing resource is available to execute the export job, and execute the export job when the computing resource is available. The electronic processor is also configured to store a job manifest in a memory location. In one example, the job manifest includes metadata for each logical object located in the logical object location.

18 Claims, 4 Drawing Sheets

(56) References Cited

U.S. PATENT DOCUMENTS

| | | | | |
|---|---|---|---|---|
| 6,711,644 | B1* | 3/2004 | Accapadi | G06F 13/12 |
| | | | | 710/263 |
| 6,763,139 | B1* | 7/2004 | Andrew | H04N 19/63 |
| | | | | 375/E7.04 |
| 7,188,240 | B1* | 3/2007 | Berstis | G06F 21/6263 |
| | | | | 709/222 |
| 7,383,294 | B1* | 6/2008 | Tamer | G06F 16/10 |
| | | | | 707/810 |
| 7,668,924 | B1* | 2/2010 | Young | H04L 67/1097 |
| | | | | 709/212 |
| 7,788,681 | B1* | 8/2010 | O'Connell, Jr. | G06F 16/958 |
| | | | | 719/330 |
| 8,140,480 | B1* | 3/2012 | Tsaur | G06F 11/1464 |
| | | | | 707/648 |
| 8,165,146 | B1* | 4/2012 | Melick | H04B 1/7163 |
| | | | | 370/428 |
| 8,336,056 | B1* | 12/2012 | Gadir | G06F 9/5027 |
| | | | | 718/104 |
| 8,468,121 | B1* | 6/2013 | Prusa | H04M 3/51 |
| | | | | 707/602 |
| 8,661,023 | B1* | 2/2014 | Chun | G06F 16/9027 |
| | | | | 707/718 |
| 8,719,445 | B2 | 5/2014 | Ko | |
| 9,349,134 | B1* | 5/2016 | Adams | H04L 63/1425 |
| 9,454,630 | B1* | 9/2016 | Lee | G06F 30/39 |
| 9,891,860 | B1* | 2/2018 | Delgado | G06F 3/0689 |
| 2002/0138735 | A1* | 9/2002 | Felt | H04L 9/3247 |
| | | | | 713/176 |
| 2003/0233539 | A1* | 12/2003 | Tardo | H04L 9/0838 |
| | | | | 713/153 |
| 2003/0236986 | A1* | 12/2003 | Cronce | G06F 21/14 |
| | | | | 713/189 |
| 2004/0098547 | A1* | 5/2004 | Ofek | G06F 11/1464 |
| | | | | 711/162 |
| 2004/0194111 | A1* | 9/2004 | Marcey | G06F 9/5044 |
| | | | | 719/310 |
| 2005/0075949 | A1* | 4/2005 | Uhrig | G06Q 10/087 |
| | | | | 705/28 |
| 2005/0080498 | A1* | 4/2005 | Tico | G10H 7/004 |
| | | | | 700/94 |
| 2005/0278451 | A1* | 12/2005 | Yamashita | G06F 8/34 |
| | | | | 709/229 |
| 2006/0184597 | A1* | 8/2006 | Yamashita | G06F 8/20 |
| | | | | 708/400 |
| 2006/0218525 | A1* | 9/2006 | Yamashita | G06F 9/54 |
| | | | | 717/109 |
| 2007/0168861 | A1* | 7/2007 | Bell | G06F 3/0481 |
| | | | | 715/701 |
| 2007/0294512 | A1* | 12/2007 | Crutchfield | G06F 8/443 |
| | | | | 712/200 |
| 2008/0183508 | A1* | 7/2008 | Harker | G16H 10/60 |
| | | | | 705/4 |
| 2009/0210878 | A1* | 8/2009 | Huang | G06F 9/4881 |
| | | | | 718/102 |
| 2010/0005136 | A1* | 1/2010 | Ferlitsch | H04N 1/00225 |
| | | | | 709/203 |
| 2011/0261876 | A1* | 10/2011 | Tan | H04N 19/127 |
| | | | | 375/240.01 |
| 2012/0204180 | A1* | 8/2012 | Santoli | G06F 9/46 |
| | | | | 718/101 |
| 2013/0010837 | A1* | 1/2013 | Kim | G01S 19/24 |
| | | | | 375/150 |
| 2013/0066952 | A1* | 3/2013 | Colrain | G06F 11/1438 |
| | | | | 709/203 |
| 2013/0073960 | A1* | 3/2013 | Eppolito | G11B 27/034 |
| | | | | 715/716 |
| 2013/0110963 | A1* | 5/2013 | Han | H04L 67/42 |
| | | | | 709/213 |
| 2013/0159428 | A1* | 6/2013 | Soundararajan | G06F 9/45533 |
| | | | | 709/206 |
| 2013/0173529 | A1* | 7/2013 | Erla | G06F 16/254 |
| | | | | 707/602 |
| 2014/0280132 | A1* | 9/2014 | Auger | G06F 9/543 |
| | | | | 707/736 |
| 2014/0368516 | A1* | 12/2014 | Taggart | G06T 1/20 |
| | | | | 345/505 |
| 2015/0063781 | A1* | 3/2015 | Silverman | H04N 21/47205 |
| | | | | 386/241 |
| 2015/0170657 | A1* | 6/2015 | Thompson | G10L 19/008 |
| | | | | 704/500 |
| 2015/0172153 | A1* | 6/2015 | Sharma | G06F 9/545 |
| | | | | 709/224 |
| 2016/0042735 | A1* | 2/2016 | Vibbert | G10L 15/222 |
| | | | | 704/257 |
| 2016/0277743 | A1* | 9/2016 | Strom | H04N 19/136 |
| 2016/0291814 | A1* | 10/2016 | Pigat | G06F 40/169 |
| 2016/0321048 | A1* | 11/2016 | Matsuura | G06F 8/4443 |
| 2017/0116237 | A1* | 4/2017 | Zhang | G06F 16/278 |
| 2017/0286159 | A1* | 10/2017 | Thiruvengadachari | |
| | | | | G06F 9/4843 |
| 2018/0077040 | A1* | 3/2018 | Araki | H04L 67/327 |
| 2018/0198930 | A1* | 7/2018 | Tokiwa | H04N 1/00244 |
| 2018/0285383 | A1* | 10/2018 | Nara | H04L 67/1097 |
| 2020/0310810 | A1* | 10/2020 | Murphy | G06F 3/0604 |

OTHER PUBLICATIONS

Richardson, Chris, "Pattern: API Gateway / Backends for Frontends", Retrieved from: https://web.archive.org/web/20190503134732/https://microservices.io/patterns/apigateway.html, 4 Pages.

Schandl, et al., "Lifting File Systems into the Linked Data Cloud with TripFS", Retrieved from: http://eprints.cs.univie.ac.at/69/1/schandl.pdf, Apr. 27, 2010, 8 Pages.

Skluzacek, Tylerj., "Skluma: An I Extensible Metadata Extraction Pipeline for Disorganized Data", in Journal of IEEE 14th International Conference on e-Science (e-Science), Oct. 29, 2018, pp. 256-266.

"Bulk Metadata Import and Export", Retrieved from: https://helpx.adobe.com/experience-manager/6-4/assets/using/metadata-import-export.html. Retrieved Date: Jul. 22, 2019, 7 Pages.

"Creating Content-Based Load Balancing", Retrieved from: https://cloud.google.com/load-balancing/docs/https/content-based-example, Retrieved Date: Jul. 22, 2019, 21 Pages.

"Exporting Table Data", Retrieved from: https://web.archive.org/web/20190616110636/https:/cloud.google.com/bigquery/docs/exporting-data, Jun. 16, 2019, 25 Pages.

"GET Object", Retrieved from: https://web.archive.org/web/20190711131647/https:/docs.aws.amazon.com/AmazonS3/latest/API/RESTObjectGET.html, Jul. 11, 2019, 21 Pages.

"Instance Metadata and User Data", Retrieved from: https://web.archive.org/web/20190721155112/https:/docs.aws.amazon.com/AWSEC2/latest/UserGuide/ec2-instance-metadata.html, Jul. 21, 2019, 17 Pages.

"Sending Batch Requests", Retrieved from: https://web.archive.org/web/20190716191458/https:/cloud.google.com/storage/docs/json_api/v1/how-tos/batch, Jul. 16, 2019, 9 Pages.

"Storing and Retrieving Instance Metadata", Retrieved from: https://web.archive.org/web/20190107162158/https:/cloud.google.com/compute/docs/storing-retrieving-metadata, Jan. 7, 2019, 27 Pages.

"Working with Log Groups and Log Streams", Retrieved from: https://web.archive.org/web/20190507225641/https:/docs.aws.amazon.com/AmazonCloudWatch/latest/logs/Working-with-log-groups-and-streams.html, May 7, 2019, 6 Pages.

"Working with Metadata Batch Definitions", Retrieved from: https://docs.oracle.com/en/cloud/saas/enterprise-performance-management-common/erpia/metadata_batch_definition_100x2df58430.html, Retrieved Date: Jul. 22, 2019, 2 Pages.

Hunt, Randall, "Amazon Comprehend Launches Asynchronous Batch Operations", Retrieved from: https://aws.amazon.com/blogs/aws/amazon-comprehend-launches-asynchronous-batch-operations/, Jun. 27, 2018, 13 Pages.

* cited by examiner

SYSTEM AND METHOD FOR EXPORTING LOGICAL OBJECT METADATA

CROSS REFERENCE TO RELATED APPLICATIONS

This application claims priority to U.S. Provisional Patent Application No. 62/881,246, filed Jul. 31, 2019, the contents of which is incorporated by reference in its entirety.

FIELD

Embodiments described herein generally relate to exporting logical object metadata.

SUMMARY

Logical object storage services and cloud computing services, for example Microsoft SharePoint™, are used to store thousands or millions of logical objects, for example files, folders, lists, list items, users, groups, permissions, and other similar objects. Each of these logical objects may have numerous associated metadata. The metadata may be organized in fields, which may be, for example, date created, original author, date last modified, and other fields. Currently, when migrating logical objects from one logical object storage location to another, thousands or hundreds of thousands of Application Programming Interface ("API") function calls must be made to each individual logical object and any nested logical objects, for example logical objects stored in a folder, in order to access metadata associated with each individual logical object. Because of the large amount of function calls, computing resources used for the data migration may become overloaded. This reduces or throttles the speed of the entire data migration by tying up computing resources with the function calls.

In order to save computing resources during data migration, a new system is required to reduce the amount of function calls and simply the various kinds of function calls, for example, down to one function call. In addition, server side logic is needed to handle, for example, the simplified function call, return the correct data, and correctly utilize available computing resources to prevent resource tie-up during the migration process.

Thus, embodiments described herein provide, among other things, systems and methods for exporting logical object metadata.

For example, one embodiment provides a system for exporting logical object metadata. The system includes an electronic processor configured to receive a first input from a user. The first input includes, for example, a logical object location and at least one metadata export option. The electronic processor is configured to create an export job based on the first input. The electronic processor is also configured to store the export job in a job queue, determine when a computing resource is available to execute the export job, and execute the export job when the computing resource is available. The electronic processor is also configured to store a job manifest in a memory location. The job manifest includes, for example, metadata for each logical object located in the logical object location.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
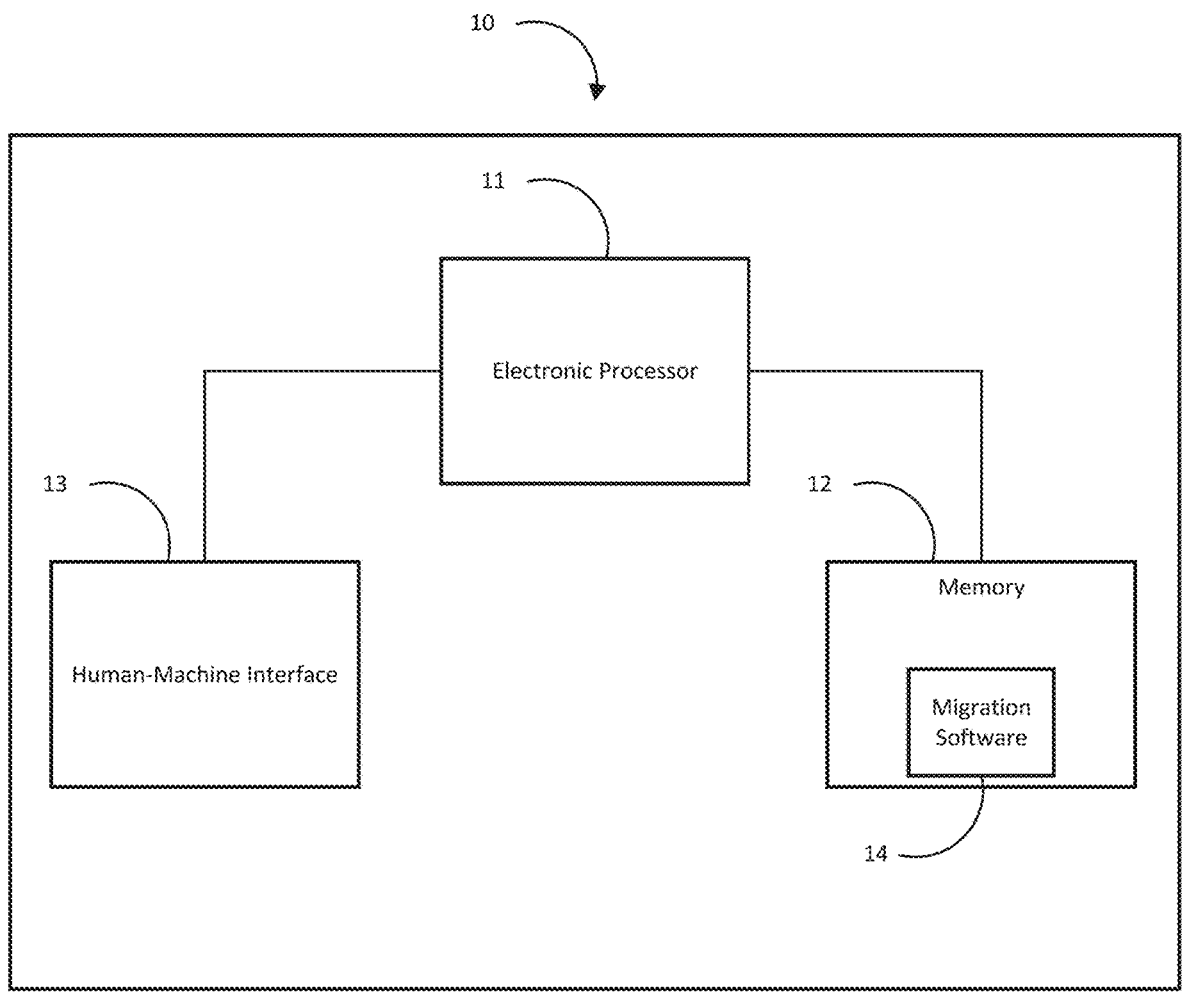
FIG. 1 illustrates a user device according to one embodiment.

FIG. 1 schematically illustrates a user device 10 according to some embodiments. In one embodiment, the user device 10 is a personal computing device, for example a desktop computer, a laptop computer, a terminal, a smart television, an electronic whiteboard, a tablet computer, a smart telephone, a wearable device, or the like. As illustrated in FIG. 1, the user device 10 includes an electronic processor 11, a memory 12, and a human-machine interface (HMI) 13. The electronic processor 11, the memory 12, and the HMI 13 communicate over one or more communication lines or buses, wirelessly, or a combination thereof. In some embodiments, the user device 10 includes additional components than those illustrated in FIG. 1 and the components included in the user device 10 may arranged in various configurations. For example, in some embodiments, the user device 10 also includes a communication interface, for example a transceiver, that allows the user device 10 to communicate with external devices, for example one or more server over a communication network as noted above. The user device 10 may also perform additional functionality than the functionality described in the present application.

The electronic processor 11 may include a microprocessor, application-specific integrated circuit (ASIC), or another suitable electronic device. The electronic processor 11 is configured to retrieve data from the memory 12 and execute, among other things, software related to the processes and methods described herein. The memory 12 includes a non-transitory, computer-readable storage medium.

The HMI 13 includes an input device, an output device, or a combination thereof. For example, the HMI 13 may include a display device, a touchscreen, a keyboard, a keypad, a button, a cursor-control device, a printer, a speaker, a virtual reality headset, a microphone, and the like. In some embodiments, the user device 14 includes multiple HMIs. For example, the user device 10 may include a touchscreen and a keypad. In some embodiments, an HMI 13 is included in the same housing as the user device 10. However, in other embodiments, an HMI 13 may be external to the user device 10 but may communicate with the user device 10 over a wired or wireless connection. For example, in some embodiments, the user device 10 includes a display device connected to the user device 10 via a cable. As described below in more detail, one or more HMIs 13 included in the user device 10 receive input (selections) from a user, which the electronic processor 11 uses to select data items to migrate or select data items to read the metadata of.

Figure 2:
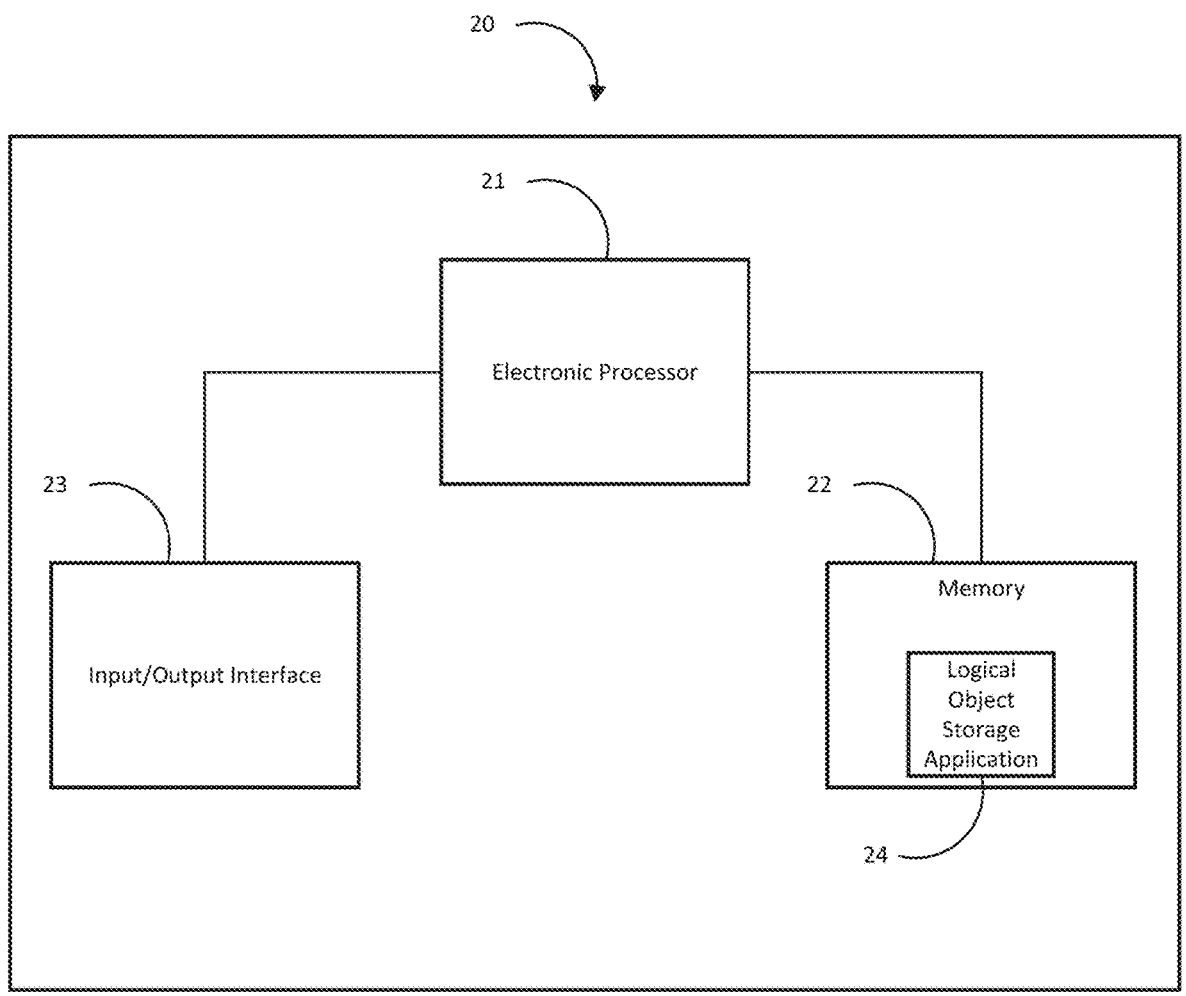
FIG. 2 illustrates a server according to one embodiment.

In the example illustrated in FIG. 1, the user device 10 includes data migration software 14 stored in the memory 12. The data migration software 14 allows a user of the user device 10 to migrate data from a memory or other storage accessible by the user device 10, for example memory in a cloud-based logical object storage system, to a server, for example a server 20 illustrated in FIG. 2. The memory in the cloud-based logical object storage system is, in one example, memory located on a source server. In one example, server 20 is a destination server for the data migration. It is to be understand that the data migration software 14 may be its own standalone software or may be a component of a larger software application. It is also to be understood that the functionality of the data migration software 14 may not be exclusively limited to data migration operations. For example, backup and/or restoration software may utilize logical object metadata reads as described below.

In the example illustrated, the server 20 includes a server electronic processor 21 and a server memory 22. The server 20 also includes an input/output interface 23 that allows the server 20 to communicate with external devices, for example the user device 10. It is to be understood that the server 20 may include more than one processor or may be implemented as one of multiple servers configured to perform the methods described herein in a cloud computing environment, a data center, or the like.

The server memory 22 includes a logical object storage application 24, for example Microsoft SharePoint™ software or some other database or file system. The logical object storage application 24 stores logical objects in a logical object structure, for example, a nested folder structure. The logical object storage application 24 is configured to provide a plurality of users access to modify, create, delete, and otherwise manage individual logical objects for group use. The stored logical objects may include documents, spreadsheets, presentations, emails, computer code, Portable Document Format ("PDF") files, other files, folders, lists, list items, groups, users, permissions, and other items. In one example, the logical object storage application 24 includes features to control checking logical objects in and out. For example, each of these logical objects may be "checked out" by a user to read or modify and then "checked in" to send any locally-made changes, for example changes to a logical object made on the user device 10, back to the logical object storage application 24, where the copy of the logical object on the server 20 is changed to reflect the sent changes from the user device 10.

In one example, each logical object stored in the logical object storage application 24 includes a variety of metadata fields. For example, each logical object may have metadata fields that indicate an original author of the logical object, a time of creation of the logical object, a most recent time of edit of the logical object, a most recent user to access the logical object or modify the logical object, a logical object size, a logical object version number, a logical object identifier, a logical object type, and other metadata associated with each of the logical objects. The metadata is or metadata fields are created and populated with values when the logical object is created in the logical object storage application 24. Certain metadata fields are updated when the logical object is modified by a user, for example a most recent edit time of the logical object and a most recent user to access and/or modify the logical object.

Figure 3:
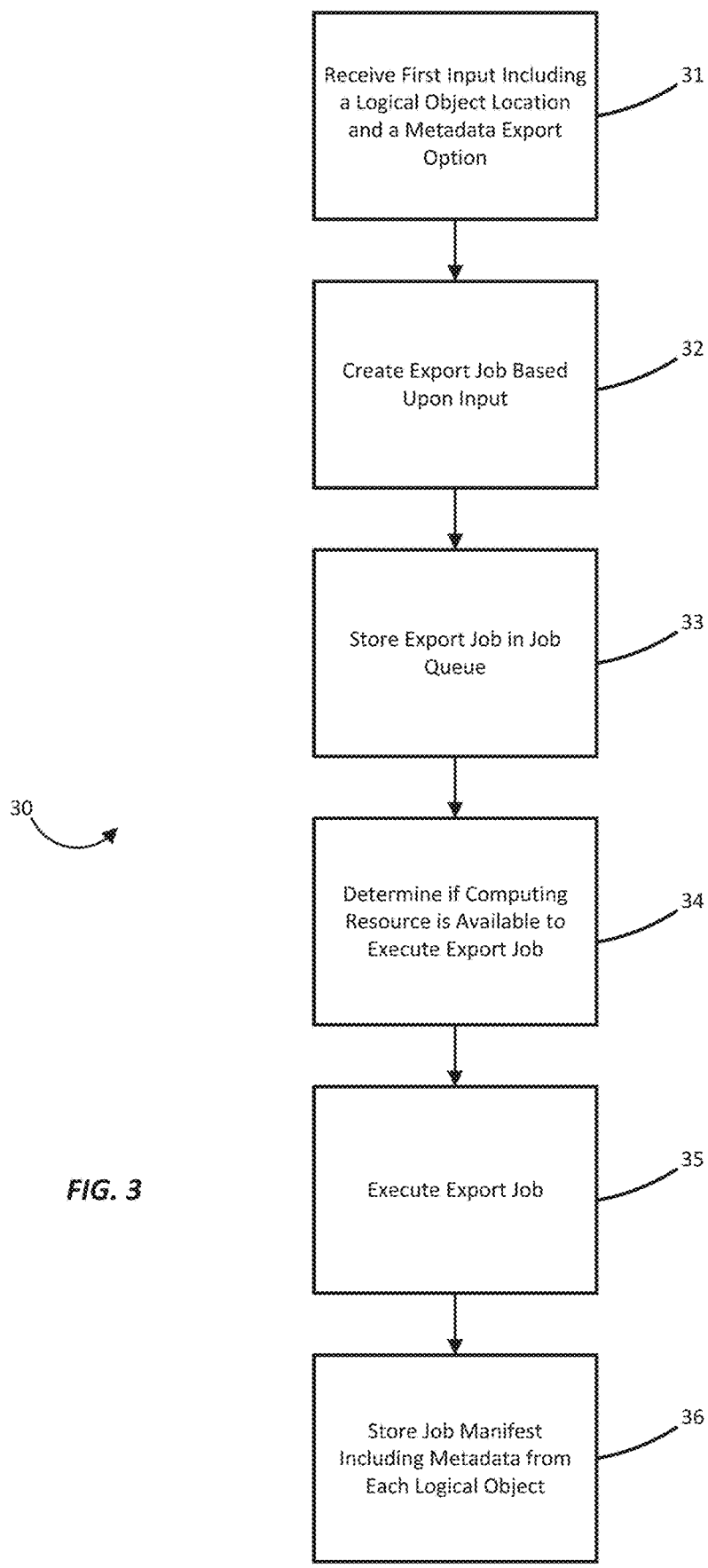
FIG. 3 illustrates a flow chart of a method for exporting logical object metadata according to one embodiment.

FIG. 3 is a flow chart illustrating a method 30 of exporting logical object metadata according to one embodiment. The method 30 is executed by the server electronic processor 21. In the example provided, the method 30 includes receiving, with the server electronic processor 21, a first input from a user of the user device 10 (at block 31). The first input is sent as a single function call from the user device 10 to the server 20 and includes a logical object location of the logical object being migrated and at least one metadata export option. The logical object location is, for example, a full path Uniform Resource Locator ("URL") specifying the location of the logical object in the logical object storage application 24. The logical object location is a container location, for example a folder or a list library, and does not specify a single logical object (e.g., only a single file or document) for metadata export. Instead, a container location is specified by the logical object location, and all logical objects that are child objects of the container have metadata exported as described below.

The metadata export option is one of various other parameters than can be passed to the server 20 with the first input. One of the potential options is an Include Versions, or version scope option. If this option is indicated in the first input, all item version history of each logical object at the logical object location are returned in the export option, as is explained in greater detail later. If the version scope option is absent, only the most recent version is provided. Another option is an Include Security, or security scope option. If this option is specified, all user and group information from the logical object location, for example who has access to the location or the group who owns the location, is returned during the export job. Otherwise, no user or group location is returned.

Other options include a child logical object scope option, which specifies that only logical objects at the top level of the logical object location have their metadata read for the export option. In other words, if this option is set, no logical objects located inside folders at the logical object location have their metadata read, and instead only the folder metadata is read. If this option is not specified, all child logical objects in folders have their metadata read. Another option is a metadata scope option, which specifies that the full list of metadata fields are returned during the export job instead of a default group of metadata fields, for example logical object name, author, modified date, create date, and logical object URL. While more detailed metadata information can be obtained using this option, computing performance for the server 20 is impacted, as the function call will require more computing resources and time to perform.

Another option is a change token option. Logical objects stored in the logical object storage application 24 include a metadata field used to track when the logical object was last accessed by the function call. This is called a change token field. When the change token option is specified, only changes made to the logical object since the last access of the logical object, as specified by the change token field, are returned for the export job. By using the change token field, less changes are retrieved, which increases the speed of and decrease the computing resources required for the export job.

Other options include an encryption option. If the encryption option is specified, a key, for example, the AES256CBC key, is used to encrypt output fields and job queue messages. A communication queue option, if specified, indicates a communication queue for the server electronic processor 21 to insert real-time status messages about the metadata export into. A memory location option may also be specified. As is described in greater detail, in one example, the memory location option indicates a location in the server memory 22 for storing job queue messages and the exported job manifest. Preferably, the memory location is a persistent logical object storage location.

Returning to FIG. 3, the example method 30 also includes creating, with the server electronic processor 21, an export job based upon the first input (block 32). Using the logical object location and any of the metadata export options provided with the function call from the user device 10, the server electronic processor 21 constructs the various function calls needed to access all of the indicated logical objects and metadata on the server side. Having the server electronic processor 21 construct the function calls reduces network bandwidth by requiring only one function call to be sent from the user device 10 to the server 20. In contrast, prior techniques required hundreds or thousands of function calls to be sent between the user device 10 and the server 20.

Once the export job is created, the server electronic processor 21 stores the export job in a job queue in the server memory 22 (at block 33). The job queue is designed to hold a list of jobs that are to be performed asynchronously with execution of other migration tasks on the server 20. In some embodiments, there are a plurality of job queues stored in the server memory 22. The job queue for the export job is selected based upon, for example, polling at a fixed time interval to determine if the server 20 (or if other servers, if server 20 is part of a server cluster) can accept the incoming export job.

In some instances, the server 20 waits for computing resources of the server 20, for example the server electronic processor 21, to be free to perform the export job in the queue (at block 34). For example, if the server 20 is part of a data center or server group, the server electronic processor 21 waits for other servers in the data center or other processors of the server 20 to become available. By waiting to execute the export job from the job queue asynchronously with other server operations, server bandwidth and computing resources are saved for migration operations and are only used to execute export jobs when the resources are free. Load balancing can also be accomplished by allowing multiple computing resources to handle different tasks of the export job in parallel, further reducing the time that the job is in a queue.

Once the computing resource(s) are free, the export job is executed by the server electronic processor 21 (block 35). During the execution of the export job, the logical objects at the specified logical object location are read, and metadata about each of the logical objects at the logical object location is collected and a job manifest is created. The job manifest is a manifest file that includes a listing of all the logical objects at the specified logical object location and the requested metadata associated with each logical object. In some embodiments, the export job creates more than one job manifest.

During execution, in addition to gathering logical object metadata in the job manifest, the server electronic processor 21 may also send periodic messages about the execution of the export job to the specified memory location. For example, if an invalid value is sent as part of the first input from the user device 10 to the server 20, the server electronic processor 21 may send a message indicating that an invalid value was sent and that an error was generated. Otherwise, a periodic status message, for example "In job queue," "Executing," or "Finished" can be sent to the memory location or to a communication queue indicated by a communication queue option.

In one example, after the full export job is complete, the job manifest is stored by the server electronic processor 21 in the specified memory location (at block 36). In response to a second user input from the user device 10 to the server 20, the server electronic processor 21 accesses the memory location and sends the job manifest to the user device 10 to be displayed to the user. In embodiments where an encryption option is set, the second user input also includes an encryption key to access the encrypted job manifest and/or a designated communication queue. In some embodiments, rather than the memory location being contained within the memory 22, the memory location is located at an external location to the server 20, and the second user input is instead handled by a processor associated with the external location or by the electronic processor 11 of the user device 10.

Figure 4:
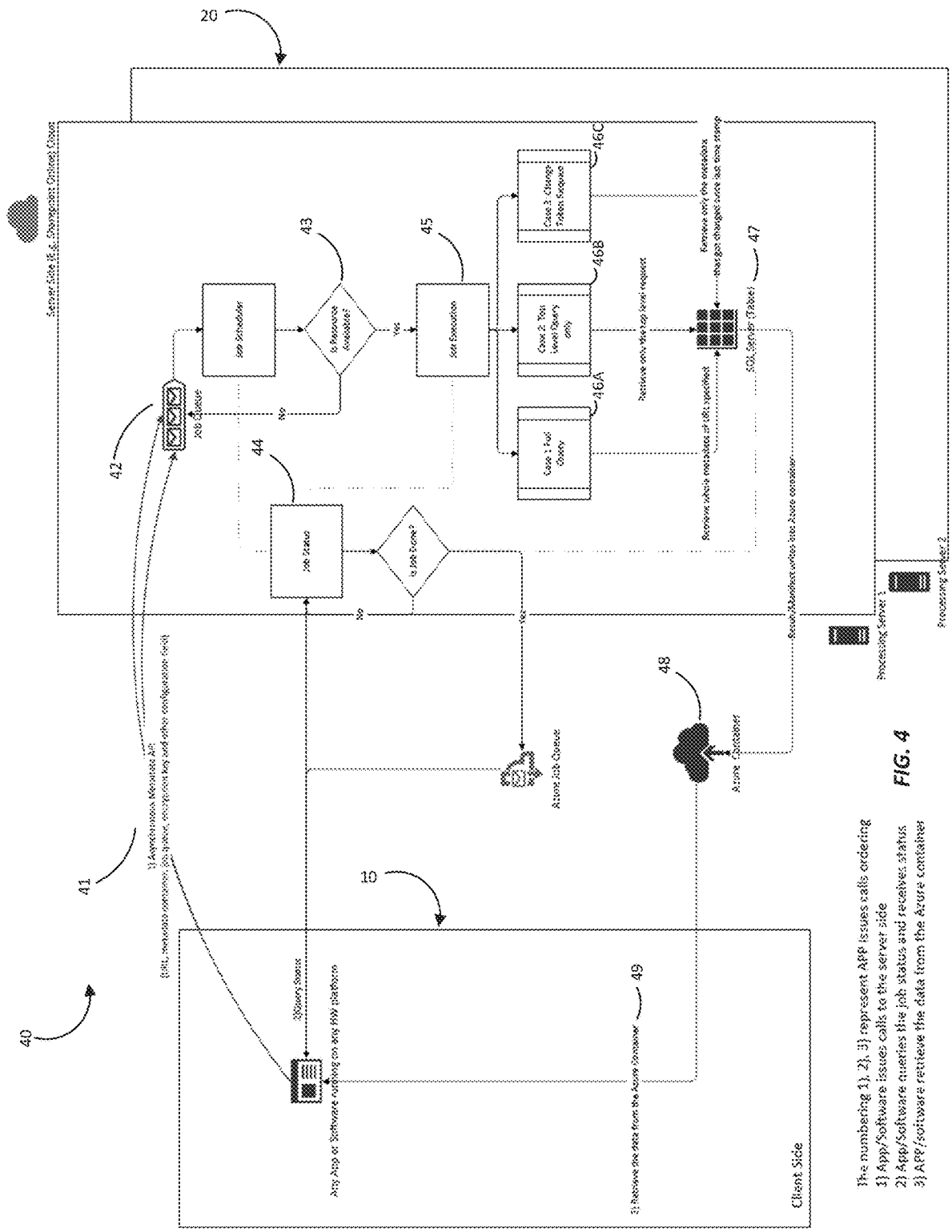
FIG. 4 illustrates a data flow diagram for exporting logical object metadata according to one embodiment.

FIG. 4 illustrates a data flow diagram 40 illustrating an example data flow for the method 30. At block 41, just like in block 31, the user device 10 sends a first input as a single function call, including the logical object location and one or more metadata export options, to the server 20. The server 20 creates the export job based upon the received first input and stores the export job in job queue 42. Once the export job is stored in the job queue 42, the server electronic processor 21 waits for computing resources to be available (block 43). During this waiting period, the user device 10 has the ability to query the server 20 to determine the job status (block 44) of the export job.

The job queue 42 stores jobs that must be executed by the server 20. When computing resources of the server 20 become available, the computing resources are allocated to execute the next job in the job queue 42. The job queue 42 is managed according to one or more methods for organizing queues, such as using first-in first-out, which adds jobs to the end of the job queue 42 and executes jobs according to the order the jobs were placed in the job queue 42. The job queue 42 may use other methods for organizing queues, such as last-in first-out.

In the example shown, once the job executes (block 45), one or more cases (one or more queries and/or requests) occurs. In one example, one of three cases occurs (blocks 46A-C). Case 1 (block 46A) is a full query of the specified logical object location, where metadata of every logical object at the logical object location and of all child logical objects of the folders at the specified logical object location is returned in the job manifest. Case 2 (block 46B) is a top level only query with a child logical object scope option, where only metadata about the logical objects located at the logical object location and the folders (and not the child logical objects of the folders) is returned in the job manifest. Case 3 is a query with a change token option, indicating that only the metadata of logical objects that has been changed since the last query of the logical object(s) should be returned in the job manifest.

In one example, the results of the cases 46A-C are written into a SQL table 47, which is then turned into the job manifest logical object and stored in the memory location (which in the example provided is illustrated as a Microsoft Azure™ container 48). The user device 10 can then retrieve the data from the memory location (at block 49).

The following examples illustrate example systems and methods described herein. Example 1: a system for exporting logical object metadata, the system comprising an electronic processor configured to receive a first input from a user, the first input including a logical object location and at least one metadata export option, create an export job based upon the first input, store the export job in a job queue, determine when a computing resource is available to execute the export job, execute the export job when the computing resource is available, and store a job manifest in a memory location, the job manifest including metadata for each logical object located in the logical object location.

Example 2: the system of example 1, wherein the electronic processor is further configured to retrieve the job manifest from the memory location and present it to the user in response to a second input from the user.

Example 3: the system of any of examples 1-2, wherein the at least one metadata export option is at least one selected from the group comprising a memory location option, an encryption option, a communication queue option, a change token option, a metadata scope option, a version scope option, a child logical object scope option, and a security scope option.

Example 4: the system of any of examples 1-3, wherein the logical object location includes a URL.

Example 5: the system of any of examples 1-4, wherein the electronic processor is further configured to generate a message associated with the execution of the export job.

Example 6: the system of example 5, wherein the message includes a status of the export job.

Example 7: the system of example 5, wherein the message includes an error associated with the export job.

Example 8: the system of any of examples 1-7, wherein the export job includes a plurality of tasks, and wherein the computing resource is one of a plurality of computing resources.

Example 9: the system of example 8, wherein different computing resources of the plurality of computing resources execute different tasks of the plurality of tasks.

Example 10: the system of any of examples 1-9, wherein the export job includes a single function call to a remote server, and wherein the job queue is located in a memory of the remote server.

Example 11: a method for exporting logical object metadata, the method comprising receiving, with an electronic processor, a first input from a user, the first input including a logical object location and at least one metadata export option; creating, with the electronic processor, an export job based upon the first input; storing, with the electronic processor, the export job in a job queue; determining, with the electronic processor, when a computing resource is available to execute the export job; executing, with the electronic processor, the export job when the computing resource is available; and storing, with the electronic processor, a job manifest in a memory location, the job manifest including metadata for each logical object located in the logical object location.

Example 12: the method of example 11, further comprising retrieving, with the electronic processor, the job manifest from the memory location and present it to the user in response to a second input from the user.

Example 13: the method of any of examples 11-12, wherein the at least one metadata export option is at least one selected from the group comprising a memory location option, an encryption option, a communication queue option, a change token option, a metadata scope option, a version scope option, a child logical object scope option, and a security scope option.

Example 14: the method of any of examples 11-13, wherein the logical object location includes a URL.

Example 15: the method of any of examples 11-14, further comprising generating, with the electronic processor, a message associated with the execution of the export job.

Example 16: the method of example 15, wherein the message includes a status of the export job.

Example 17: the method of example 15, wherein the message includes an error associated with the export job.

Example 18: the method of any of examples 11-17, wherein the export job includes a plurality of tasks, and wherein the computing resource is one of a plurality of computing resources.

Example 19: the method of example 18, wherein different computing resources of the plurality of computing resources execute different tasks of the plurality of tasks.

Example 20: the method of any of examples 11-19, wherein the export job includes a single function call to a remote server, and wherein the job queue is located in a memory of the remote server.

Thus, embodiments described herein provide methods and systems for exporting logical object metadata. Various features and advantages of some embodiments are set forth in the following claims.

What is claimed is:

1. A system comprising:
a server configured to:
receive a single function call, wherein the single function call is generated based on a first input, the first input including a logical object location and at least one metadata export option, wherein a plurality of logical objects are stored at the logical object location in a memory of the server, and wherein the at least one metadata export option specifies only changes made to the plurality of logical objects;

create an export job based on the single function call;
store the export job in a job queue of the server;
determine when a computing resource of the server is available to execute the export job;
execute the export job using the computing resource when the computing resource is available, wherein execution of the export job queries the logical object location stored on the server using the single function call;
store results of the query in the memory of the server;
convert the stored results into a job manifest, the job manifest including metadata for each of the plurality of logical objects stored at the logical object location; and
store the job manifest in a job manifest memory location.

2. The system of claim 1, wherein the job manifest is presented to a user on a user interface in response to a second input from the user.

3. The system of claim 1, wherein the at least one metadata export option is at least one selected from the group comprising a memory location option, an encryption option, a communication queue option, a change token option, a metadata scope option, a version scope option, a child logical object scope option, and a security scope option.

4. The system of claim 1, wherein the logical object location includes a URL.

5. The system of claim 1, wherein the server is further configured to generate a message associated with the execution of the export job.

6. The system of claim 5, wherein the message includes a status of the export job.

7. The system of claim 5, wherein the message includes an error associated with the export job.

8. The system of claim 1, wherein the export job includes a plurality of tasks, and wherein the computing resource is one of a plurality of computing resources.

9. The system of claim 8, wherein different computing resources of the plurality of computing resources execute different tasks of the plurality of tasks.

10. A method comprising:
receiving, by a server, a single function call, wherein the single function call is generated based on a first input, the first input including a logical object location and at least one metadata export option, wherein a plurality of logical objects are stored at the logical object location in a memory of the server, and wherein the at least one metadata export option specifies only changes made to the plurality of logical objects;
creating, by the server, an export job based on the single function call;
storing, by the server, the export job in a job queue of the server;
determining, by the server, when a computing resource of the server is available to execute the export job;
executing, by the server, the export job using the computing resource when the computing resource is available, wherein executing the export job includes querying, by the server, the logical object location stored on the server using the single function call;
storing, by the server, results of the query in the memory of the server;
converting, by the server, the stored results into a job manifest, the job manifest including metadata for each of the plurality of logical objects stored at the logical object location; and
storing, by the server, the job manifest in a job manifest memory location.

11. The method of claim 10, wherein the job manifest is presented to a user on a user interface in response to a second input from the user.

12. The method of claim 10, wherein the at least one metadata export option is at least one selected from the group comprising a memory location option, an encryption option, a communication queue option, a change token option, a metadata scope option, a version scope option, a child logical object scope option, and a security scope option.

13. The method of claim 10, wherein the logical object location includes a URL.

14. The method of claim 10, further comprising generating, by the server, a message associated with the execution of the export job.

15. The method of claim 14, wherein the message includes a status of the export job.

16. The method of claim 14, wherein the message includes an error associated with the export job.

17. The method of claim 10, wherein the export job includes a plurality of tasks, and wherein the computing resource is one of a plurality of computing resources.

18. The method of claim 17, wherein different computing resources of the plurality of computing resources execute different tasks of the plurality of tasks.

* * * * *